Feb. 19, 1929.　　　　　　　　　　　　　　　　　　　1,702,321
R. L. SMITH
HEAT EXCHANGE APPARATUS
Filed Feb. 16, 1926　　　　2 Sheets-Sheet 2

Inventor.
Roland L. Smith
by Heard Smith & Tennant.
Attys.

Patented Feb. 19, 1929.

1,702,321

UNITED STATES PATENT OFFICE.

ROLAND L. SMITH, OF BELMONT, MASSACHUSETTS.

HEAT-EXCHANGE APPARATUS.

Application filed February 18, 1926. Serial No. 88,719.

In the embodiment of the invention herein disclosed, there is provided a novel form of heating unit adapted to form a floor board of the vehicle. Herein, such a unit comprises a thin, hollow receptacle of generally rectangular form adapted to lie upon the usual floor boards of the vehicle and to extend the width of the vehicle, means being provided to introduce a heated fluid such as heated water into said receptacle and to deliver the same therefrom so that a circulation will be continuously maintained through said chamber.

Herein, the heating unit is provided with means for reenforcing the upper wall of the heating unit when the heating unit is used as a floor board.

The invention will be best understood by reference to the following description, when taken in connection with the accompanying drawings of one specific embodiment thereof, while its scope will be more particularly pointed out in the appended claim.

Figure 1:
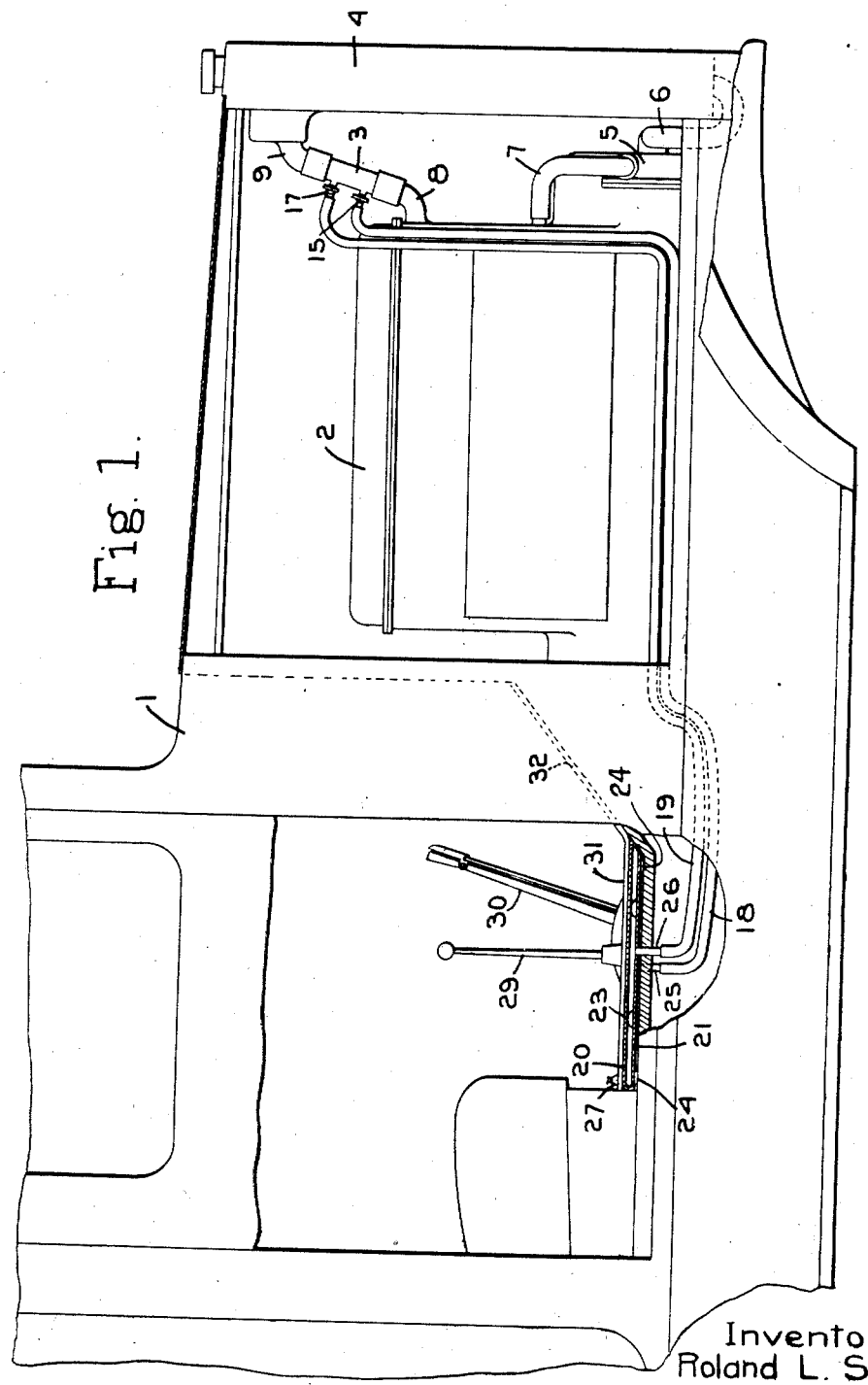
Fig. 1 is an elevation of a portion of an automobile having a water cooled power unit and a radiator, illustrating the invention as applied thereto, a portion of the body being broken away, and the heating unit resting upon the floor board shown in section.
Figure 2:
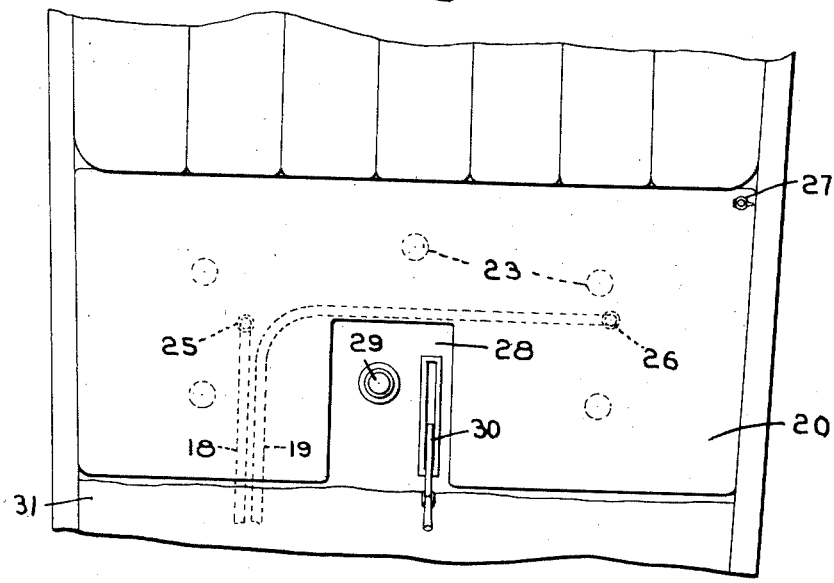
Fig 2 is a plan view of the heating unit located upon the floor board lying in front of the front seat of the automobile.
Figure 3:
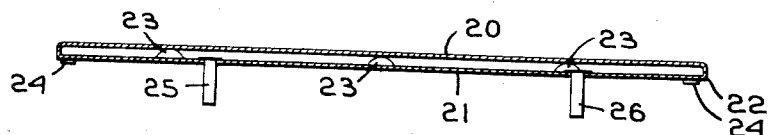
Fig. 3 is a sectional view longitudinally of the heating unit.
Figure 4:
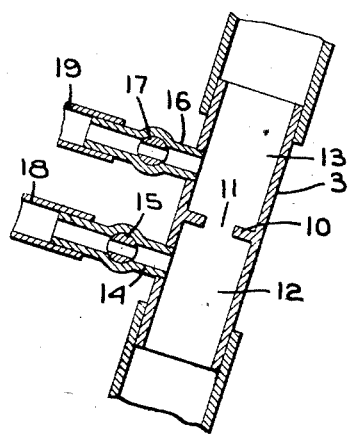
Fig. 4 is an enlarged detail view through the section of the conduit leading from the water jacket to the radiator and illustrating the pipes communicating with the intake and delivery sections thereof through which water is supplied to the heating unit and returned therefrom to the conduit.

Referring to the drawings, and to the embodiment of the invention which is selected for exemplification, there is shown novel means for heating the body of an automobile or other vehicle, the invention being shown herein as applied to an automobile having a power unit comprising a usual type of water jacketed internal combustion engine.

The body 1 of the automobile is illustrated herein as of the "closed car type", but it will be understood that the invention may be employed in an open car or in any other type of vheicle, or in any enclosure which surrounds or is in the vicinity of a water jacketed power unit. The power unit 2 may be of any usual type of internal combustion engine having a water jacket with a conduit 3 leading therefrom to the radiator 4. In the present example, a pump 5, the intake of which is connected by a pipe 6 to the lower portion of the radiator, delivers water through a pipe 7 to the jacket of the engine and maintains a continuous circulation, while the engine is running, through the water jacket, the conduit 3 and radiator 4. In some types of power units, the water through the water jacket and radiator is maintained in circulation by thermo-siphonic action, and it will be understood that the invention is equally applicable to water circulating systems of this type.

The present invention comprises means for utilizing the heat from the water jacket of the power unit by diverting from one portion of the system, a portion of the water passing therethrough, utilizing the heat from the water thus diverted, and by returning the same water to another portion of the system, thereby maintaining a continuous circulation of a substantially uniform volume of water through the water jacket and radiator. The water thus diverted herein is employed as a heat transporting means to transmit its heat to heat utilizing means such as a radiator unit located in a suitable portion of the vehicle or enclosure. Herein, the radiating unit employed for heating an automobile comprises a thin, hollow receptacle adapted to rest upon or to be used as a floor board for the vehicle, and presenting a broad, flat, upper surface.

In usual engines, the conduit for returning the water from the water jacket to the radiator comprises a pipe or nipple 8 leading from the water jacket, a nipple 9 leading to the radiator, with the conduit 3 extending from the nipple 8 to the nipple 9. In many instances, this connection is formed of flexible material, such as a section of rubber hose.

In the present embodiment of the invention, a portion of the water passing through the conduit is diverted from one section thereof to the heating unit, and the water thus diverted is returned to the other section of the conduit.

In the construction illustrated herein, the conduit 3 is provided intermediate its ends with a dam which is formed as an annular rib 10, thus providing a restricted passage 11 through which the water passes from the water jacket to the radiator. This rib, therefore, divides the conduit into two sections 12 and 13, which may be designated as an intake section and a delivery section for the water flowing from the water jacket to the radiator. A pipe 14 communicates with the intake section 12, and herein is provided with a valve 15. A similar pipe 16 communicates with the delivery section 13, and herein is provided with a valve 17. Pipes 18 and 19, leading from the respective pipes 14 and 16, communicate with the chamber of a heating unit presently to be described, circulation being maintained through these pipes and through the heating unit by reason of the difference in pressure in the intake section 12 and the delivery section 13 of the conduit 3.

Herein, flexible pipes 18 and 19 may be employed, so that the unit may be placed in any desirable part of the vehicle.

In the construction illustrated herein, a novel form of heating unit is employed, which is so constructed as to form a floor board of the vehicle. This heating unit is in the form of a thin receptacle of generally rectangular form, and herein is of such length as to extend the entire width of the body of the vehicle in which it is used. The receptacle disclosed herein is made of sheet metal having an upper wall 20, presenting a flat upper face, and a lower wall 21 parallel therewith and narrowly spaced therefrom. The edges of one of the walls, herein the upper wall, are turned down and are secured to the other wall by a welded joint 22, thus making a substantially integral, hollow rectangular construction. In order to stiffen the upper wall, one of the walls, herein the lower wall, is stamped up to provide concave-convex reenforcing members 23, which engage the under surface of the upper wall 20, and herein are secured thereto as by being welded thereto. In the present embodiment, the lower wall 21 is spaced from the supporting floor board therebeneath as by short legs 24, conveniently secured to the lower wall by being welded to the lower wall 21, thereby elevating the latter to permit the circulation of air therebeneath, thus to utilize the heat radiated under the side of the lower wall. The inlet and outlet pipes 25 and 26 herein extend through the lower wall 21 at suitable intervals, desirably near the opposite end portions thereof, so that the water will be circulated through the chamber of the receptacle.

As illustrated herein, the flexible pipe 18, which leads from the intake section of the conduit 3, is connected to the intake pipe 25 of the heating unit and the outlet pipe 26 of the heating unit is connected by the pipe 19 to the delivery chamber of the conduit 3.

In the operation of the device, therefore, the circulation of the water immediately begins upon the starting of the engine as the usual pump 6 is operated during the entire period the engine is running. As soon as the engine is started, the water in the water jacket absorbs heat from the engine cylinders, and in a very short time the water, which is discharged from the water jacket through the conduit 3, becomes heated. By reason of the difference in pressure in the intake and delivery sections of the conduit 3, a portion of this heated water is diverted through the pipe 18 into the radiating unit, and is caused to flow therethrough and to be discharged through the pipes 26 and 19 into the delivery section of the conduit 3, where it joins the water which passes through the restricted opening 11 of the conduit 3 and flows therewith into the radiator. Thus all of the water which passes through the water jacket is circulated through the radiator, but a portion of the water is by-passed through the heating unit. By suitably regulating the valve 15, the amount of water thus by-passed through the heating unit may be regulated. Further regulation may also be made by adjustment of the valve 17. By closing the valves 15 and 17, all circulation of water through the heating unit may be stopped, and the heating unit, if desired, may then be removed from the vehicle, as would ordinarily be done in summer weather.

In order to provide for the escape of air from the heating unit, a pet-cock 27, herein is located at one of the corners of the heating unit.

The heating unit is illustrated herein as lying upon the floor board before the front part of a usual type of automobile, and as extending from one side of the vehicle to the other. The front portion of the heating unit is provided near its center with a recess 28, through which the control levers 29 and 30 extend. The usual floor mat 31 is placed upon the flat upper surface of the heating unit, and thereby protects the feet from direct contact with the heating unit. Furthermore, if the heating unit becomes too warm for comfort, the occupant may place his foot upon the inclined portion 32 of the floor. As the heating unit lies near the lower edge of the usual doors of the automobile, the cold air entering through the cracks at the bottom of the door will come in contact with the heating unit, either by passing beneath the lower face thereof or by passing in proximity to the upper face, and in either instance the air thus introduced will be heated, and will tend to rise and circulate throughout the body of the car. It will, of course, be obvious that a suitable heating unit of the type described may be located in front of the rear seat, or in any other part of the vehicle, as may be desired.

It will be understood that the term "water-jacket" is used in a broad sense, to include the use of steam or any other suitable cooling fluid medium.

Having thus described one embodiment of the invention, but without limiting the same thereto, what is claimed as new, and desired to be secured by Letters Patent, is:

Heat exchange apparatus comprising a support, a thin, hollow, sheet metal receptacle having two narrowly separated, generally parallel, walls, comprising two generally flat, sheet metal plates whose edges are secured together, the lower wall being provided exteriorly with feet to support the same flatwise on said support, one of said walls being indented to provide a projection which engages the internal surface of the other wall and maintains the spacing of said walls, and means for conducting a fluid into and out of said receptacle.

In testimony whereof, I have signed my name to this specification.

ROLAND L. SMITH.